US007106385B1

(12) United States Patent
Keen

(10) Patent No.: US 7,106,385 B1
(45) Date of Patent: Sep. 12, 2006

(54) APPARATUS AND METHOD FOR REDUCING THE VISUAL EFFECTS OF ARTIFACTS PRESENT IN A LINE SCANNED VIDEO DISPLAY

(75) Inventor: Ronald Thomas Keen, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 09/465,038

(22) Filed: Dec. 16, 1999

(51) Int. Cl.
*H04N 5/21* (2006.01)

(52) U.S. Cl. ................ 348/607; 348/241; 348/622

(58) Field of Classification Search ............... 348/21, 348/241, 606, 607, 609, 612, 620, 621, 622, 348/625, 618, 619, 630, 631; H04N 5/21
See application file for complete search history.

(56) References Cited

U.S. PATENT DOCUMENTS

| 3,836,707 | A | * | 9/1974 | Murakami et al. ......... 348/665 |
| 4,003,077 | A | | 1/1977 | Hickok |
| 4,065,784 | A | | 12/1977 | Rossi |
| 4,081,827 | A | | 3/1978 | Hipwell |
| 4,106,059 | A | * | 8/1978 | Henderson et al. ........ 348/731 |
| 4,134,126 | A | | 1/1979 | Hirai |
| 4,240,105 | A | | 12/1980 | Faroudja |
| 4,291,330 | A | | 9/1981 | Hirai |
| RE32,194 | E | | 6/1986 | Machida et al. |
| 4,607,286 | A | | 8/1986 | Weimer |
| 4,613,828 | A | * | 9/1986 | Collette ..................... 331/47 |
| 4,814,863 | A | | 3/1989 | Topper et al. |
| 4,959,717 | A | | 9/1990 | Faroudja |
| 5,200,822 | A | | 4/1993 | Bronfin et al. |
| 5,294,985 | A | * | 3/1994 | Desor et al. ............... 348/380 |
| 5,461,426 | A | * | 10/1995 | Limberg et al. ........... 348/473 |
| 5,574,512 | A | | 11/1996 | Saeger |
| 5,610,955 | A | * | 3/1997 | Bland ....................... 327/156 |
| 5,625,421 | A | | 4/1997 | Faroudja et al. |
| 5,629,739 | A | | 5/1997 | Dougherty |
| 5,633,689 | A | * | 5/1997 | Willis et al. ............... 348/663 |
| 5,812,184 | A | * | 9/1998 | Martinez ................... 725/121 |
| 5,901,178 | A | | 5/1999 | Lee et al. |
| 6,035,184 | A | * | 3/2000 | Koh .......................... 455/255 |
| 6,046,646 | A | * | 4/2000 | Lo et al. .................... 331/10 |
| 6,046,735 | A | * | 4/2000 | Bassetti et al. ............ 345/204 |
| 6,233,672 | B1 | * | 5/2001 | Lynch ........................ 712/222 |
| 6,282,243 | B1 | * | 8/2001 | Kazui et al. ............ 375/240.16 |
| 6,285,865 | B1 | * | 9/2001 | Vorenkamp et al. ....... 455/307 |
| 6,291,088 | B1 | * | 9/2001 | Wong et al. ............ 252/62.3 R |
| 6,294,936 | B1 | * | 9/2001 | Clementi ................... 327/147 |
| 6,470,048 | B1 | * | 10/2002 | Fenne ....................... 375/240 |

* cited by examiner

*Primary Examiner*—Brian P. Yenke
(74) *Attorney, Agent, or Firm*—Joseph J. Laks; Harvey D. Fried; Patricia A. Verlangieri

(57) ABSTRACT

On a line scanned video display, the frequency of an artifact producing signal within the video passband is selected to be an odd harmonic of one half the horizontal line scan frequency so that adjacent scan lines of the artifact are 180 degrees out of phase with each other. Thus, the artifact is rendered largely visually canceled when viewed due to the integrating characteristics of the eye of the viewer, even though the artifact is still there.

3 Claims, 1 Drawing Sheet

US 7,106,385 B1

APPARATUS AND METHOD FOR REDUCING THE VISUAL EFFECTS OF ARTIFACTS PRESENT IN A LINE SCANNED VIDEO DISPLAY

FIELD OF THE INVENTION

The present invention relates to the processing of video signals, and more particularly, to the amelioration of artifacts introduced by periodic signals leaking or introduced into the luminance channel of a color television receiver.

BACKGROUND

As a review, for an NTSC color television signal, the spectral energy of the luminance (Y) signal is essentially centered at harmonics of the line scanning frequency $nf_h$ where n is an integer. Thus, a luminance signal typically has frequency components of $1f_h$, $2f_h$, $3f_h$, $4f_h$, etc. The chrominance (C) signal spectral energy peaks occur at odd harmonics of one half the line scanning frequency, i.e., $(n+\frac{1}{2})f_h$ where n is an integer. Thus, the Y and C energy spectra are frequency interleaved.

U.S. Pat. No. 4,607,286 of Weimer concerns the electrostatic coupling of forward clocking signals in a CCD imager to the underlying bulk semiconductor substrate which introduces transient disturbances leaving visible artifacts in television pictures reconstructed from the video signals generated from the CCD imager. An additional clocked delay places the disturbances into the line retrace interval and the disturbances are removed from the video signals by line retrace blanking.

U.S. Pat. Nos. 4,291,330 and 4,134,126, both of Hirai, teach that in a color video recorder, an interfering or cross-talk signal having a frequency $(n+\frac{1}{2})f_h$ will have a frequency interleaved relationship to the frequency of the main luminance components with the result that the cross-talk signal will be phase inverted in successive horizontal lines of the video signals, and that since there is a high correlation between the reproduced luminance components in successive horizontal line intervals, the cross-talk signals will not appear as a conspicuous noise or beat on an image reproduced on a cathode ray tube but will be largely visually canceled.

U.S. Pat. No. 4,003,077 of Hickock concerns a color video recorder wherein the chrominance information is frequency converted before recording to a frequency to render, upon display, an artifact pattern of one line of the picture frame being 180 degrees out of phase with the artifact pattern of an adjacent line, so that the resultant artifact pattern, although present, seemingly disappears due to the integrating effect of the eye of the viewer.

SUMMARY OF THE INVENTION

During production of a video processing integrated circuit having, inter alia, a graphics generator, a video processor, and a spread spectrum clock, it was discovered that the signal for FM modulating the carrier signal of the clock, due to internal signal leakage within the chip, caused an artifact to appear when viewed on a line scanned video display, e.g., a cathode ray tube. Rather than undertake the extensive and expensive redesign of the integrated circuit to eliminate the artifact, since the frequency of the interfering signal was selectable, it was decided to select the frequency of the interfering signal so that the frequency would be an odd harmonic of one half the horizontal line scan frequency. By making the particular selection of frequency to be an odd harmonic of one half of the horizontal line scan frequency, adjacent scan lines of the artifact are 180 degrees out of phase with each other. Thus, the artifact is rendered largely visually canceled when viewed on a line scanned display, due to the integrating characteristics of the eye of the viewer, even though the artifact is still there.

BRIEF DESCRIPTION OF THE DRAWING

The invention is illustrated in the accompanying drawing wherein.

DETAILED DESCRIPTION OF THE PREFERRED EMBODIMENT

Figure 1:
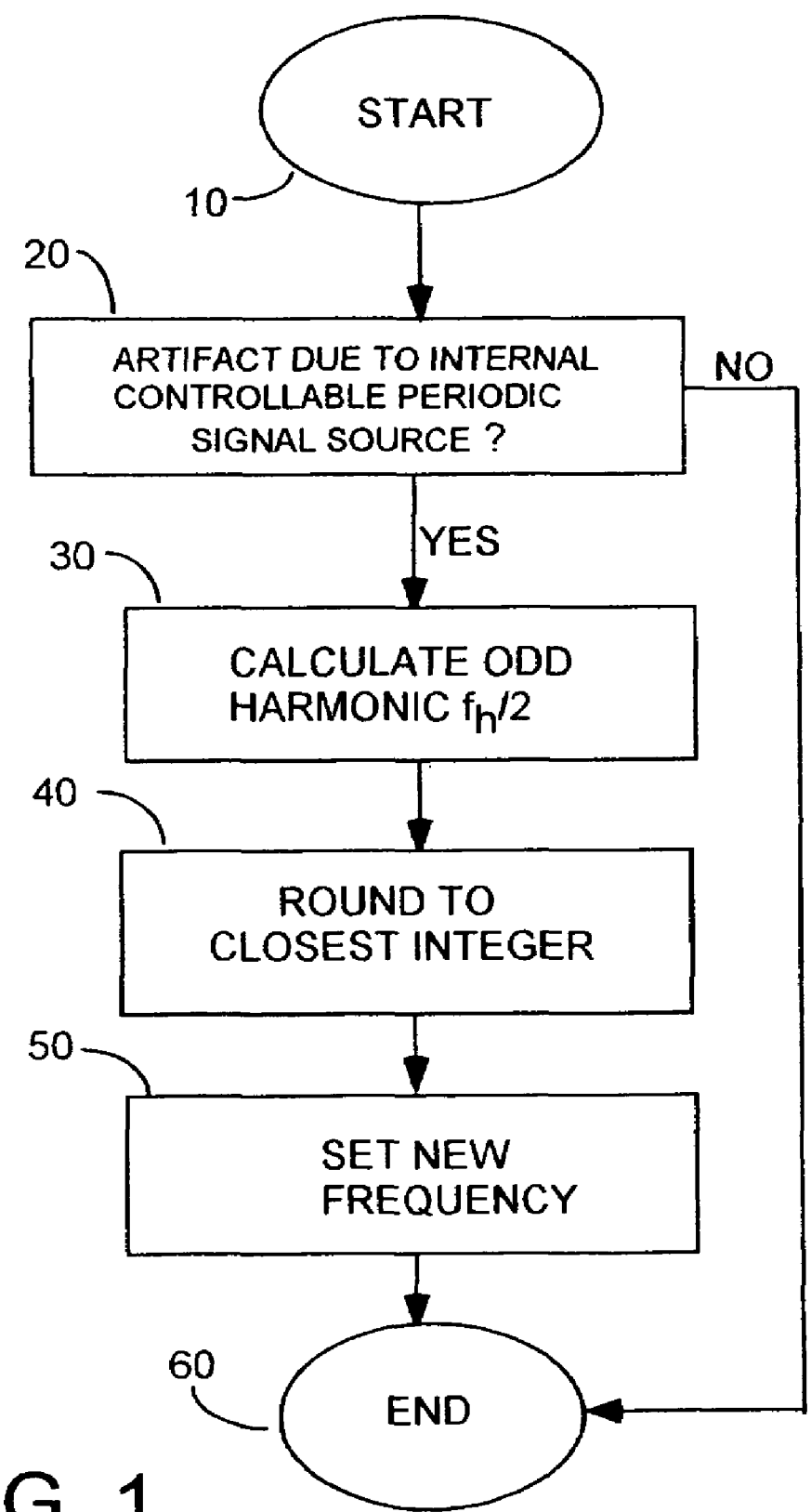
FIG. 1 is a flow chart illustrating the method of the invention.

The exemplary embodiment of the present invention concerns an integrated circuit number W49C31-20A which is a low-power CMOS monolithic chip made by the IC Works of San Jose, Calif., USA, and includes a graphics processor, a video processor and a spread spectrum clock. The present invention concerns a video processor wherein a signal having a frequency within the video passband "leaks" into the video processor, and in the exemplary embodiment, the leaked signal, which produces an artifact on a video display, is derived from the modulation signal of a spread spectrum clock. It should be noted however, for purposes of the present invention, that the leaked artifact producing signal can be derived from any source, and leaked or introduced into any common video processor. Thus, the construction and circuitry of the exemplary chip including the exemplary video processor, the exemplary spread spectrum clock, and the exemplary generation of the modulation signal for the spread spectrum clock, all form no part of the present invention.

It is believed that the artifact creating signal leaks into the video path by electrostatic and/or capacitive coupling either between sections, or through electrostatic and/or capacitive coupling by the respective structures with the semiconductor substrate material. The artifact creating signal in the exemplary embodiment, is the modulation signal of a spread spectrum clock which falls within the video passband of up to 10 MHz. The carrier signal for the clock is outside of the video passband, i.e., 85 MHz, but if it fell within the video passband, or any other frequency selectable, periodic, artifact producing signal fell within the video passband, the present invention would be equally applicable in order to "hide" the produced artifact.

More particularly, during production of the monolithic integrated circuit it was discovered that the signal for FM modulating the carrier signal of the clock, due to internal signal leakage within the chip, caused an artifact to appear when viewed on a line scanned video display such as a cathode ray tube. Rather than undertake the extensive and expensive redesign of the integrated circuit to eliminate the artifact, it was decided to take an alternate approach.

The frequency of the interfering signal was selectable. Thus, it was decided that since the frequency was selectable, to select the frequency of the interfering signal so that the signal frequency would be an odd harmonic of one half the horizontal line scan frequency commonly referred to as $f_h$, which for an NTSC signal is 15,734.26573 Hz. Thus, the particular selection of frequency of the interfering modulation signal of the spread spectrum clock was 39.336 kHz (2.5 multiplied by $f_h$), which can be rounded up or down to the nearest integral kHz of 39 kHz or 40 kHz.

For such a harmonic relationship to $f_h$, the artifact displayed on adjacent scan lines on the line scanned display are 180 degrees out of phase with each other. Thus, the artifact is rendered largely visually canceled when viewed due to the integrating characteristics of the eye of the viewer, even though the artifact is still there. This is true for both interlaced and progressive scan frames except that one line at the top or bottom of each interlace field will not appear to be canceled. The line having the visually unreduced artifact can be placed in the vertical overscan portion of picture, and thus will be hidden, or can be hidden by vertical blanking.

Further, the interfering signal is also frequency interleaved with the luminance signal, as discussed above in the background section. The frequency interleaving further reduces artifacts.

The present invention is applicable to the choice of the frequency of a periodic signal within the video passband, leaked or intentionally introduced by whatever means, into a video signal path of whatever means, which causes an artifact to appear when viewed on a line scanned display. Such an intentional introduction of an artifact producing signal into the video path can be, e.g., an information encoded signal. It should be noted that the artifact producing signal of the exemplary embodiment is an information encoded signal but the introduction into the video signal path was unintentional.

The foregoing description of the method of the present invention is further illustrated and summarized by the flow chart of FIG. 1. In step 10 the artifact correction is begun. In step 20 (ARTIFACT DUE TO INTERNAL CONTROLLABLE PERIODIC SIGNAL SOURCE) it is determined if the artifact is attributable to a periodic signal of controllable frequency that is generated in the television receiver. If the signal source is not generated internally in the receiver or if it is not of controllable frequency (path NO), then the process ends (step 60).

If the periodic signal source is generated in the TV receiver and is also of controllable frequency, the process continues (path YES) to Step 30 (CALCULATE ODD HARMONIC OF $f_H/2$) which comprises calculating a value for the frequency of the periodic signal to be equal to an odd harmonic of $f_H/2$. Step 40 (ROUND TO CLOSEST INTEGER) comprises rounding the calculated value of the signal to the closest integer number of kHz of the calculated value. Then, at step 50 (SET NEW FREQUENCY) the frequency of the periodic signal is set to be equal to the rounded value from step 40 and the process ends at step 60 (END).

What is claimed is:

1. In a television receiver having a line scanned video display with a scan frequency of $f_h$, a method for reducing the visual effects of an artifact in a line scan portion of said video display, comprising the steps of:
   (i) determining if said artifact is attributable to a periodic signal generated in said television receiver and being of controllable frequency;
   (ii) calculating a value for the frequency of said periodic signal to be an odd harmonic of $f_h/2$;
   (iii) rounding the calculated value of said periodic signal to an integer number of kHz; and then
   (iv) setting said frequency of said periodic signal to be equal to said rounded value.

2. A method as recited in claim 1, wherein:
   (i) the rounded value of said periodic signal is lower than the calculated value; and
   (ii) the rounded value equals 39.000 kHz.

3. A method as recited in claim 1, wherein:
   (i) the rounded value of said periodic signal is higher than the calculated value; and
   (ii) the rounded value equals 40.000 kHz.

* * * * *